United States Patent
Doshi

(10) Patent No.: US 12,096,071 B2
(45) Date of Patent: *Sep. 17, 2024

(54) SYSTEMS AND METHODS FOR DETERMINING USAGE INFORMATION

(71) Applicant: Comcast Cable Communications, LLC, Philadelphia, PA (US)

(72) Inventor: Nishant Doshi, Norristown, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,394

(22) Filed: Jul. 12, 2023

(65) Prior Publication Data

US 2023/0362437 A1    Nov. 9, 2023

Related U.S. Application Data

(63) Continuation of application No. 17/848,165, filed on Jun. 23, 2022, now Pat. No. 11,736,766, which is a continuation of application No. 16/149,857, filed on Oct. 2, 2018, now Pat. No. 11,412,295.

(51) Int. Cl.
*H04N 21/442* (2011.01)
*G10L 15/08* (2006.01)
*H04N 21/262* (2011.01)
*H04N 21/422* (2011.01)

(52) U.S. Cl.
CPC ..... *H04N 21/44204* (2013.01); *G10L 15/083* (2013.01); *H04N 21/26241* (2013.01); *H04N 21/42203* (2013.01); *G10L 2015/088* (2013.01)

(58) Field of Classification Search
None
See application file for complete search history.

(56) References Cited

U.S. PATENT DOCUMENTS

| | | | | |
|---|---|---|---|---|
| 8,138,930 B1* | 3/2012 | Heath | ...... | G01W 1/00 |
| | | | | 455/456.3 |
| 8,225,194 B2* | 7/2012 | Rechsteiner | ...... | H04N 21/858 |
| | | | | 715/206 |
| 8,799,070 B1* | 8/2014 | Sheinfeld | ...... | G06Q 30/0242 |
| | | | | 705/14.72 |
| 9,338,493 B2* | 5/2016 | Van Os | ...... | H04N 21/42203 |
| 9,548,053 B1* | 1/2017 | Basye | ...... | G10L 15/22 |
| 9,554,061 B1* | 1/2017 | Proctor, Jr. | ...... | H04S 7/00 |
| 10,074,364 B1* | 9/2018 | Wightman | ...... | G10L 15/285 |
| 10,157,042 B1* | 12/2018 | Jayakumar | ...... | H04R 27/00 |
| 10,171,877 B1* | 1/2019 | Shah | ...... | H04N 21/4223 |

(Continued)

OTHER PUBLICATIONS

US Patent Application filed on Jun. 23, 2022, entitled "Systems and Methods for Determining Usage Information", U.S. Appl. No. 17/848,165.

*Primary Examiner* — Ricky Chin
(74) *Attorney, Agent, or Firm* — BakerHostetler

(57) ABSTRACT

Systems and methods are described for determining usage information. A computing device may determine an advertising event associated with content. The computing device may cause activation of a data capture component to capture data at one or more times associated with the advertising event. The data can be analyzed to determine usage information indicative of user behavior during the advertising event.

24 Claims, 7 Drawing Sheets

(56) References Cited

U.S. PATENT DOCUMENTS

| | | | |
|---|---|---|---|
| 10,425,687 B1* | 9/2019 | Karnezos | H04H 60/33 |
| 10,522,146 B1* | 12/2019 | Tushinskiy | G10L 15/22 |
| 10,542,315 B2* | 1/2020 | Shaw | H04N 21/812 |
| 10,565,998 B2* | 2/2020 | Wilberding | G10L 17/22 |
| 10,714,081 B1* | 7/2020 | Miller | G10L 15/08 |
| 10,854,199 B2* | 12/2020 | Hanes | G06F 1/3206 |
| 10,871,943 B1* | 12/2020 | D'Amato | G06F 3/165 |
| 11,412,295 B2* | 8/2022 | Doshi | H04N 21/26241 |
| 11,736,766 B2* | 8/2023 | Doshi | H04N 21/42202 |
| | | | 725/14 |
| 2007/0243930 A1* | 10/2007 | Zalewski | G06Q 30/02 |
| | | | 463/35 |
| 2008/0109222 A1* | 5/2008 | Liu | G10L 15/26 |
| | | | 705/14.54 |
| 2011/0119126 A1* | 5/2011 | Park | G06Q 30/0242 |
| | | | 705/14.45 |
| 2015/0189219 A1* | 7/2015 | Kopalle | H04N 21/4394 |
| | | | 348/632 |
| 2015/0271570 A1* | 9/2015 | Pomeroy | H04N 21/26283 |
| | | | 725/14 |
| 2015/0302458 A1* | 10/2015 | Dides | G06Q 30/0261 |
| | | | 705/14.58 |
| 2015/0379568 A1* | 12/2015 | Balasubramanian | |
| | | | G06Q 30/0261 |
| | | | 705/14.53 |
| 2016/0037213 A1* | 2/2016 | Collins | H04N 21/4126 |
| | | | 725/10 |
| 2017/0013312 A1* | 1/2017 | Salomons | H04N 21/44226 |
| 2017/0098250 A1* | 4/2017 | Masson | G06Q 30/0275 |
| 2017/0103754 A1* | 4/2017 | Higbie | G06F 3/165 |
| 2017/0195730 A1* | 7/2017 | Das | H04N 21/6543 |
| 2017/0339467 A1* | 11/2017 | Patel | H04N 21/44227 |
| 2019/0019504 A1* | 1/2019 | Hatambeiki | G10L 15/20 |
| 2019/0037254 A1* | 1/2019 | Fennelly | H04N 21/6581 |
| 2019/0213423 A1* | 7/2019 | Haberstroh | H04N 21/41407 |
| 2019/0362719 A1* | 11/2019 | Gruenstein | G06F 3/167 |
| 2019/0370843 A1* | 12/2019 | Chen | G06Q 30/0267 |
| 2019/0371324 A1* | 12/2019 | Powell | G10L 15/22 |
| 2020/0107071 A1* | 4/2020 | Doshi | H04N 21/44218 |
| 2021/0204023 A1* | 7/2021 | Knox | H04N 21/42201 |
| 2022/0256233 A1* | 8/2022 | Grover | H04N 21/4852 |

\* cited by examiner

SYSTEMS AND METHODS FOR DETERMINING USAGE INFORMATION

CROSS REFERENCE TO RELATED APPLICATIONS

This application is a continuation application of U.S. patent application Ser. No. 17/848,165, filed Jun. 23, 2022, now U.S. Pat. No. 11,736,766 issued Aug. 22, 2023, which is a continuation application of U.S. patent application Ser. No. 16/149,857, filed Oct. 2, 2018, now U.S. Pat. No. 11,412,295 issued Aug. 9, 2022, which are each hereby incorporated by reference for any and all purposes.

BACKGROUND

Content is often displayed with advertisements to users. A targeted advertisement may be more effective and beneficial for a particular viewer and a company associated with the advertisement. Some conventional systems are unable to gain any information about a user's response to an advertisement. Other proposed systems are overly complex, gather too much information, and are too invasive of privacy. These and other shortcomings are addressed by the present disclosure.

SUMMARY

Systems and methods are described for determining usage information associated with content. A content device may be sending or otherwise outputting content for a user. An advertising event (e.g., break, slot, time period, opportunity) associated with the content may be determined. The advertising event may comprise a start time. A data capture component, such as an audio input component (e.g., microphone), may be activated before the start time. Data, such as audio data, may be determined (e.g., generated, recorded, measured) and used to generate one or more metrics, such as noise levels associated with ties before, after, or during the advertising event. The data may also be used to determine other information, such as keywords, commands, and other user actions. Usage information may be generated by comparing the one or more metrics, such as comparing a first metric associated with content before the advertising event to a second metric associated with (e.g., based on data captured during) the advertising event. The usage information may be determined by the content device. Advertisement information may be updated based on the usage information and used to determine more relevant advertisements for users.

BRIEF DESCRIPTION OF THE DRAWINGS

The following drawings show generally, by way of example, but not by way of limitation, various examples discussed in the present disclosure. In the drawings.

The following drawings show generally, by way of example, but not by way of limitation, various examples discussed in the present disclosure. In the drawings.

DETAILED DESCRIPTION

Figure 1:
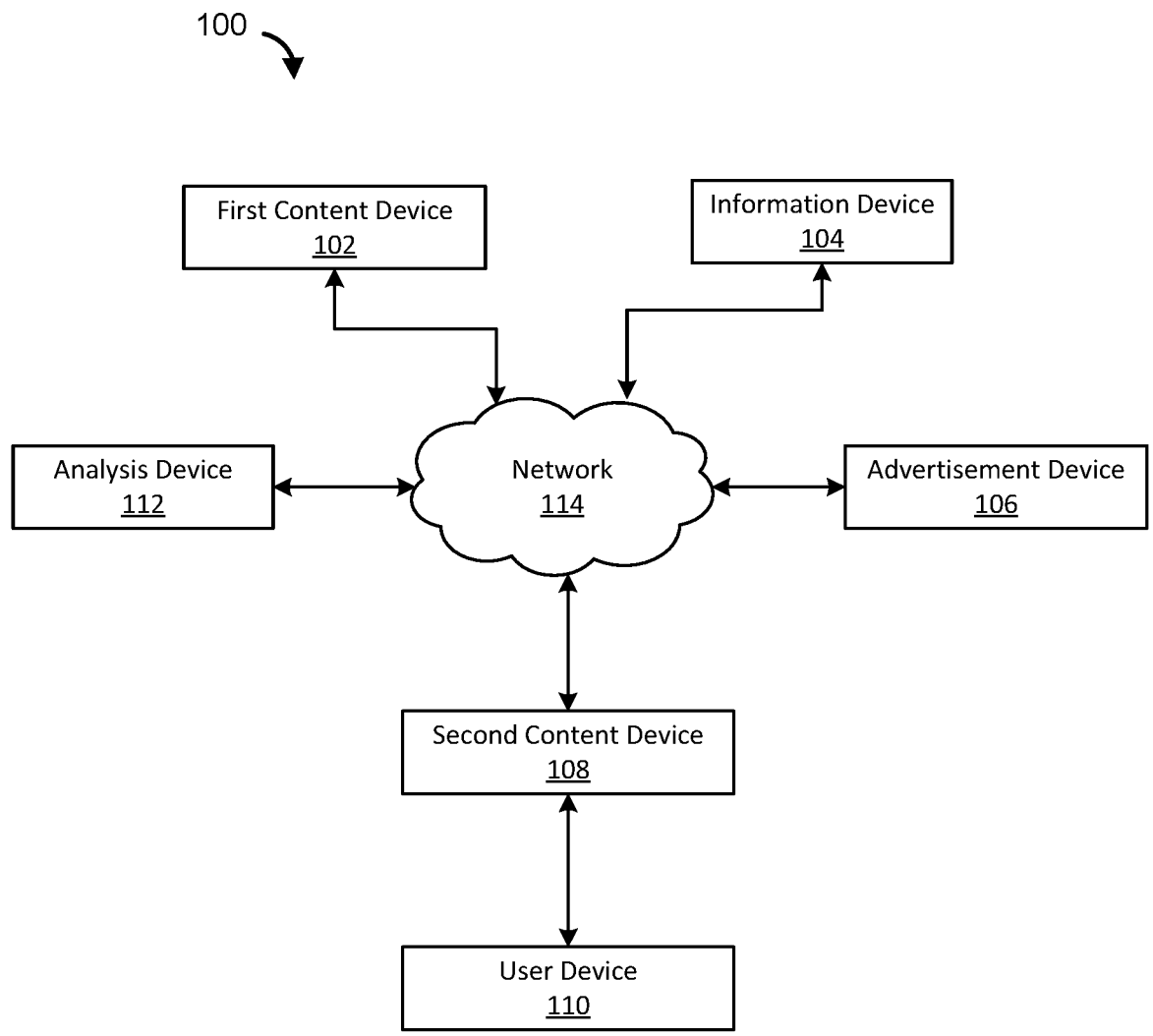
FIG. 1 is a block diagram of an example system for sending content.

Systems and methods are described for determining usage information. The systems and/or methods disclosed herein may analyze data associated with an (e.g., audio or other data) advertising event (e.g., break, slot, time period, opportunity) to determine usage information indicative of user behavior associated with the advertising event. Data, such as audio data, determined during the advertising event may be compared to data determined before and/or after the advertising event. An audio input (e.g., audio receiver, microphone) may be triggered to record audio data during an advertising event to determine a possible effectiveness of advertisements (e.g., commercials, etc.) aired during the advertising event and allow selection of advertisements that are more interesting to a user in the future. Analysis of certain information, such as noise levels and other metrics as described herein, allows for more efficient use of network and processing resources than conventional systems.

A remote control associated with a content device (e.g., a set-top box) may be configured to control the content device. The remote control may be a dedicated controller or a user device (e.g., a smart phone) configured to perform many different operations. The remote control or user device may pair with (e.g., connect to, etc.) the content device and run an application that allows for control of the content device using navigation controls, voice controls and/or the like. A content device may be tuned to a particular channel at a particular time or streaming a particular content item.

The content device may be configured to output advertisements during advertisement events. Advertising events may be triggered on the content device based on ad scheduling information, such as code, metadata, or other information. An advertising event may be marked by Society of Cable Telecommunications Engineers (SCTE)-30 and/or SCTE-35 signaling that the advertisements are coming up. If the ad scheduling information is detected, the content device may trigger an activation of an audio input (e.g., microphone) on the remote control and/or the user device. The use of the audio input and other sensors of a mobile device or other remote control allows for analysis to be performed without the purchase of additional costly hardware required by conventional systems.

A data capture component, such as an audio input component (e.g., microphone), may be configured to capture data. The data capture component may be comprised in the user device or the remote control. The data capture component may capture audio data and send the audio data to the content device. The data capture component may be caused to be activated prior to (e.g., a few seconds prior to, etc.) an airing of an advertising event. Audio data determined (e.g., collected, observed, recorded, reported, measured, etc.) during the time prior to the airing of the advertising event may be used to determine ambient noise levels in a room comprising the content device. The content device may determine the ambient noise levels. The content device may send (e.g., transmit, provide, etc.) the determined audio data associated with (e.g., or captured during) the time just prior to the airing of the advertising event to a remote system, and the remote system may determine the ambient noise levels. The precise control of the times when audio data is captured allows for more efficient use of processing and network bandwidth than conventional systems. The user is given more privacy than conventional systems.

The audio input may continue capturing audio data during the airing of the advertising event. The content device and/or the remote system may analyze the audio data captured during the airing of the advertising event to determine an interest in the advertisements being aired. If the analysis reveals that audio is muted during the advertising event and unmuted at some point during the advertising event, then an assumption may be made that there is an interest in an advertisement corresponding to the unmuting. Audio associated with an advertisement may be filtered out of the audio data captured during the airing of the advertising event, leaving only audio associated with conversations in the room and/or other ambient noise. The analysis may comprise natural language processing (NLP) to identify keywords in the audio data. For example, the filtered audio data may comprise utterances of users in proximity to the audio input and may further comprise keywords. If an identified keyword from the audio data matches a desired keyword in an aired commercial, then an assumption may be made that there is an interest in the aired commercial comprising the matched keyword. The analysis may comprise determining audio level, pitch, and/or frequency variations in conversations. A user may select a particular advertisement using voice input to the audio input (e.g., microphone). If a channel change is determined, then the audio input may discontinue capturing audio signals. Account information associated with a user (e.g., a viewer, a subscriber, etc.) may be updated based on the audio signals analyzed just prior to and during the advertising event. Advertisements more relevant to the user may be selected in the future based on the updated account information.

FIG. 1 is block diagram showing an example system 100 for determining user behavior. The system 100 may be configured to deliver content to users, via a content and/or access network. The system 100 may allow users to access content via content channels, streaming channels, and/or the like. The system 100 may be configured to insert advertisements and/or other relevant content into content accessed by a user. The system 100 may use audio data and/or other captured data to determine a user's reaction to a content, such as an advertisement. The system 100 may comprise a variety of devices, such as a first content device 102, an information device 104, an advertisement device 106, a second content device 108, a user device 110, an analysis device 112, and/or the like.

The system 100 may comprise a network 114. The network 114 may be configured to communicate data, information, content, and/or the like between one or more of the devices of the system 100. The network 114 may comprise fiber links, coaxial cable links, a combination thereof, and/or the like. The second content device 108 may be in communication with the network 114. The second content device 108 may be in communication with the network 114 via coaxial cable, fiber optical links, the like, and/or any combination of the foregoing. The second content device 108 may communicate over the network 114 using Data over Cable Service Interface Specification (DOCSIS). The analysis device 112, the first content device 102, the information device 104, and the advertisement device 106 may be in communication with each other as well as the second content device 108 via the network 114.

The system 100 may allow access to content via the first content device 102. The first content device 102 may be configured for sending content via the network 114 to different locations and devices. The first content device 102 may comprise a computing device, such as a server. The first content device 102 may comprise an access platform, such as a converged access platform for accessing content via a variety of content platforms (e.g., cable streaming, internet protocol streaming, and/or the like). The first content device 102 may comprise one or more transcoders (e.g., for encoding, encryption, transcoding), multiplexers, packagers (e.g., just-in-time packaging), storage, and/or the like for sending content in a variety of formats and distribution mediums.

The first content device 102 may send content, via the network 114, based on one or more content channels. The content channels may be associated with corresponding networks, regions, content providers, and/or the like. The content channels may correspond to frequency ranges used to send the content. The content channels may correspond to network locations. The content channels may be delivered based on non-packet switching (e.g., quadrature amplitude modulation based content stream) and/or packet switching (e.g., internet protocol based content stream). The content channels may be associated with corresponding numbers or other titles. The content may also comprise content on demand, recorded content, live content, streaming content, and/or the like. The content may comprise video, audio, text, metadata, and/or the like.

The system 100 may store information associated with the content (e.g., for use by services associated with the content). The information device 104 may be configured to store the information associated with the content. The information device 104 may comprise one or more computing devices, such as one or more servers, databases, and/or the like. The information device 104 may comprise an electronic programming guide (EPG). The information device 104 may store the information associated with the content in a database, a distributed file system, and/or the like. The information associated with the content may comprise metadata, such as show titles, show identifiers, genre, actor, network, and/or the like. The information associated with content may comprise start times, end times, schedules, and/or the like associated with specific content items, such as shows, programs, movies, newscast, sportscast, and/or the like. The information associated with the content may comprise advertising information, such as start times, end times, schedules, and/or the like associated with specific advertising events (e.g., breaks, slots, time periods). A particular show may have several advertising events. Start times and/or end times of each of the advertising events may be stored in the information associated with the content. The information device 104, may be configured to receive queries for the information from other devices, such as the second content device 108, the first content device 102, the user device 110, and/or the like.

The system 100 may send (e.g., together or separately) advertisements and/or other relevant content with the content. The advertisement device 106 may be configured to manage the advertisements and/or other relevant content. The advertisement device 106 may comprise one or more computing devices, such as a server. The advertisement device 106 may be managed by a third party provider. The system 100 may be in communication with different advertisement devices managed by different third party advertisement providers. The advertisement device 106 may be configured to access and/or store a plurality of advertisements. The advertisements may be associated with one or more advertisement campaigns. The advertisement device 106 may store manifests (e.g., index of content fragments) associated with corresponding advertisements.

The advertisement device 106 may be configured to send an advertisement (e.g., and corresponding manifest) in response to a request for an advertisement. The advertisement device 106 may be configured to select an advertisement for a particular user. The advertisement device 106 may be configured to select the advertisement based on a keyword associated with a user. The keyword may comprise a keyword detected in audio captured by a device (e.g., the user device 110) associated with the user. The advertisement device 106 may be configured to store user information. The user information may comprise usage information, such as a history of user behaviors associated with prior advertisements. The usage information (e.g., the user behaviors) may comprise detected events, such as changing a channel, muting an advertisement, unmuting an advertisement, requesting more information about an advertisement, detection of a keyword captured during an advertisement, detection of a conversation during an advertisement, detection of a lack of conversation during an advertisement, and/or the like. The usage information may comprise determined metrics, such as interest levels, noise levels, and/or the like associated with an advertisement and/or advertisement event. The user information may comprise demographic information for an account. The advertisement device 106 may comprise other information that may be considered when selecting an advertisement for a video stream associated with an account.

The system 100 may allow a user to access, via the second content device 108, the content, the advertisements (e.g., or other relevant content), the information associated with the content, and/or the like. The second content device 108 may be configured to send, output, and/or display the content to a user. The second content device 108 may comprise a digital streaming device, a digital content device, a set-top box, a content recording device, a computing device, and/or the like. The second content device 108 may be in communication with a display, such as a television, a monitor, a touchscreen, and/or the like. The second content device 108 may receive content for the user (e.g., from the first content device 102). The second content device 108 may receive content via a cable access network, a packet switched streaming network, and/or the like. The second content device 108 may comprise one or more tuners for tuning into a plurality of content channels. The second content device 108 may comprise an application interface configured to display options for content, such as recorded content, content items, content channels, and/or the like. The application interface may be configured to communicate with the first content device 102, the information device 104, the advertisement device 106, the analysis device 112, and/or the like.

The second content device 108 may be controlled by the user device 110 (e.g., to access and/or navigate the content). The user device 110 may comprise a computing device. The user device 110 may be located at a user premises. The user device 110 may comprise a control device, such as a remote control, a smart device (e.g., smart watch, smart accessory, smart phone, smart apparel, smart band, smart speaker), a mobile device (e.g., tablet device, electronic reader, mobile phone, laptop), an assistant device (e.g., a virtual assistant). The user device 110 and the second content device 108 may communicate via a wireless channel. The user device 110 may be wirelessly paired with the second content device 108. The user device 110 may communicate with the second content device 108 using radio frequency (RF) communication, Bluetooth, Wi-Fi, or any other communication method. The second content device 108 may send a wireless signal to the user device 110 (e.g., based on the pairing). The user device 110 and the second content device 108 may be configured for two-way communication. The user device 110 may comprise an application, such as a downloadable application. The application may comprise navigation controls (e.g., play, pause, fast forward, rewind). The application may comprise a voice command button configured to trigger recording of audio data associated with a voice command.

The user may command the second content device 108 to access different content, such as content items, content channels, and/or the like. The user may indicate the command to the user device 110, which may send the command to the first content device 102 (e.g., or in some cases, may send the command directly to the first content device 102). The second content device 108 may be configured to pair with the user device 110. For example, the second content device 108 may authorize, authenticate, and/or the like the user device 110. The user device 110 may authorize, authenticate, and/or the like the second content device 108.

The user device 110 may comprise a data capture component configured to capture (e.g., measure, record, determine) data associated with the user. The data capture component may comprise one or more of an audio input (e.g., microphone, audio receiver), a noise level sensor, a gesture detector (e.g., keystroke recorder, swipe recorder), a video recorder, camera, a heart rate detector, a light sensor, accelerometer, pressure sensor, touch sensor, and/or the like. The data capture component may be configured to capture data based on user input, such as a user pressing a button. The user may press a voice control and speak one or more commands to the user device 110. The data capture component may be triggered without a button, such as in response to a gesture, movement, or audio command. The data capture component may be triggered by another device, such as the second content device 108, the first content device 102, the advertisement device, and/or the like.

The second content device 108 may be configured to trigger the data capture component based on an advertising event (e.g., rendering of advertisement, advertisement break, advertisement slot, advertisement opportunity, advertisement time period). The second content device 108 may be configured to determine timing information for an advertising event. The timing information may comprise a start time of the advertising event, an end time of the advertising event, a duration of the advertising event, and/or the like. The timing information may be determined by querying the information device 104. The timing information may be received from the first content device 102 by the second content device 108. The timing information may be embedded in, packaged with, and/or received with the content. The timing information may comprise an advertisement cue (e.g., SCTE signal). The timing information may comprise a metadata field in a content stream of the content. The timing information may be received in a manifest file. The manifest file may comprise an indication of a plurality of content segments, locations for accessing the content segments, timing information associated with the segments, and/or the like. The manifest file may identify the advertising event, a start time of the advertising event, an end time of the advertising event, and/or ordering of the advertising event in relation to the content, and/or the like.

The second content device 108 may be configured to cause activation of the data capture component. The activation may be based on the timing information. The second content device 108 may be configured to determine a data capture time. The data capture time may be based on the timing information associated with the advertising event.

The data capture time may be determined by adding and/or subtracting a pre-determined time (e.g., pre-ad time or post ad time) from at least a portion of the timing information (e.g., the start time, the end time). The data capture time may be a pre-determined time before or after the start time of the advertising event. The second content device 108 may be configured to cause activation of the data capture component at the data capture time.

The user device 110 may send an acknowledgment indicating that the data capture component has been modified (e.g., activated, deactivated, changed from one mode to another). In some scenarios, permission may be requested of the user to activate the data capture component. The user device 110 may be authorized before activation of the data capture component is caused. An application may be granted access to the data capture component (e.g., the audio input or microphone) by changing an operating system setting and/or other application setting.

The second content device 108 may cause the data capture component of the user device 110 to activate at a first time prior to the advertising event. The second content device 108 may cause an audio input (e.g., microphone) on the user device 110 to activate at the first time prior to the advertising event. The first time may comprise the data capture time. The second content device 108 may receive data (e.g., audio, video, sensor data, captured text, movements) from the data capture component of the user device 110 at the first time prior to the advertising event. The second content device 108 may receive audio data from the audio input of the user device 110 at the first time prior to the advertising event. The second content device 108 may determine a first metric associated with the first time. The first metric may comprise a lowest level (e.g., lowest noise level) of a portion of the audio data associated with (e.g., or captured at) the first time. The first metric may comprise a loudest level (e.g., loudest noise level) of the portion of the audio data associated with the first time. The first metric may comprise a first range (e.g., noise level range) comprising the lowest level to the highest level. The second content device 108 may forward (e.g., send, transmit, transfer, route, etc.) the captured data (e.g., audio data) received at the first time prior to the advertising event and/or first metric to the analysis device 112 via the network 114. The analysis device 112 may determine the lowest level and the loudest level (e.g., the first range) associated with the audio data received at the first time prior to the advertising event.

The data capture component on the user device 110 may continue capturing data at a second time during the advertising event. The audio input on the user device 110 may continue receiving audio data at the second time during the advertising event. The second content device 108 may receive the audio data from the audio input of the user device 110 at the second time during the advertising event. The second content device 108 may detect usage information based on the audio data received at the second time during the advertising event. The usage information may be indicative of user behavior during the advertising event. The second content device 108 may send (e.g., forward, transmit, transfer, route, etc.) the audio data received at the second time during the advertising event to the analysis device 112 via the network 114. The analysis device 112 may determine the usage information based on the audio data received at the second time during the advertising event. The analysis device 112 may also determine the additional metrics.

Determining usage information may comprise determining audio associated with the advertising event is muted, determining audio associated with the advertising event is unmuted, determining that a conversation is taking place, the like, and/or any combination of the foregoing. If the loudest level of the first range is not detected in the audio data received at the second time during the advertising event, then a determination may be made that audio associated with the advertising event is muted. If audio associated with the advertising event is determined to be muted and if the loudest level of the first range is subsequently detected in the audio data received at the second time during the advertising event, then a determination may be made that audio associated with the advertising event is unmuted. If the audio data received at the second time during the advertising event is louder than the loudest level of the first range, then a determination may be made that the audio data received at the second time comprises a conversation. If the audio data received at the second time during the advertising event indicates a change in ambient noise, whether a mute is detected or not, then a determination may be made that the audio data received at the second time comprises a conversation.

The second content device 108 may determine an interest in an advertisement in the advertising event based on the usage information. The interest may be determined based on an association (e.g., or mapping) of detected events (e.g., or combination of events) to corresponding interests (e.g., interest levels). A determination that audio associated with the advertising event is muted may indicate disinterest in an associated advertisement. A determination that audio associated with the advertising event is unmuted may indicate interest in an associated advertisement. If there is a determination that the audio data received at the second time comprises a conversation, the audio associated with the advertisement may be filtered out resulting in filtered audio data. The filtered audio data (e.g., or the audio data received at the second time, if the audio data is not filtered) may be analyzed using one or more natural language processing (NLP) applications to detect one or more keywords. Detection of a keyword may indicate interest in an associated advertisement. Failure to detect a keyword may indicate disinterest in an associated advertisement. The usage information may be updated to comprise the interest.

One or more additional metrics may also be determined (e.g., based on the data). The usage information may be determined based on the one or more additional metrics. The one or more additional metrics may be used to determine an operation for determining the usage information. If the one or more additional metrics indicate a certain language, it may be determined to perform a translation operation, to change a setting of a natural language processor, and/or the like. The one or more additional metrics may comprise a language, a dialect, a number of different voices (e.g., different people) detected, an estimated gender, an estimate age, and/or like. If a foreign language is detected in audio data, then the foreign language may be translated into the language used to analyze the audio data. A keyword associated with an advertisement may be translated into the detected language for determining whether the keyword was spoken. The one or more additional metrics (e.g. or other information, such as user profile data) may be used to exclude certain results (e.g., as outlier data). If the number of detected voices is greater than is typically detected, it may be determined that the audio data includes people who do not live at a location. If the data does not match user profile data (e.g., voice signature of a user), then the data may be excluded. The one or more additional metrics may also be sent to the advertisement device 106 and/or the analysis device 112.

The user device 110 may be caused to deactivate (e.g., or change from active listening mode to passive listening mode) the data capture component if a deactivation event is detected. The deactivation event may indicate that a user is not engaged in viewing content. The user device 110 may detect a channel change command and determine to deactivate the data capture component. The second content device 108 may receive data from another device such as a camera, a motion sensor, wearable device, virtual assistance (e.g., smart speaker), and/or the like indicating that the user has left a room where the content is displayed. The second content device 108 may send a message to deactivate the data capture component, if it is determined that the user left the room.

The system 100 may be configured to use the analysis device 112 to process data (e.g., recorded audio data) from the second content device 108. The second content device 108 may send (e.g., forward, transmit, transfer, route, etc.) the usage information (e.g., detected events) to the analysis device 112 via the network 114. The analysis device 112 may determine an interest in an advertisement in the advertising event based on the usage information. The analysis device 112 may be configured to access and/or store a user profile associated with a user, an account, a location, and/or the like. The user profile may comprise a history of user behavior, a history of metrics (e.g., noise levels), a history of keywords detected, a history of advertisements viewed, and/or the like. The analysis device 112 may receive data (e.g., audio data, or other data from the data capture component) from a plurality of user devices at different locations. The analysis device 112 may queue the data from the plurality of user devices for analysis. The analysis device 112 may leverage cloud computing or other distributed processing techniques to process the data. The analysis device 112 may be able to determine trends, patterns, and/or the like in the data from different users. For example, the analysis device 112 may determine that more users in certain demographic categories (e.g., location, gender, age, race, language) reacted to an advertisement and/or did not react to an advertisement.

The analysis device 112 may be configured to perform different types of analysis based on one or more rules. The one or more rules may comprise a rule that if a noise level does not change during the advertising event, then no keyword search will be performed. The one or more rules may comprise a rule that if the noise level does change (e.g., indicating conversation is taking place), then the data will be processed (e.g., natural language processing) to determine if any keywords associated with an advertisement or advertisement event are detected.

The analysis device 112 may be configured to prioritize data analysis. The data analysis may be prioritized based on history, rules, machine learning, pattern detection, and/or the like. If a user device 110 is associated with a profile that has less data (e.g., than a threshold, than average), then processing the data received from that user device 110 may be prioritized above processing data from other user devices. If a user device 110 is associated with a profile that has a history of successful analysis (e.g., detection of user reaction to advertisement) and/or advertising, then processing the data received from that user device 110 may be prioritized above processing data from other user devices. Some user devices 110 may be excluded from data analysis. An excluded device may comprise a device associated with noise (e.g., many people talking, lots of background noise), a device for which a user has not granted data capture permission, a device for which a user has requested that data permission not be performed, a device associated with a subscription tier (e.g., a higher tier with no advertisements), a device associated with a user under a certain age, and/or the like. User devices 110 may be excluded and/or prioritized based on demographics, such as age of user, race or language of user, gender of user, geographic location (e.g., apartment, city, suburb, rural) of the user, and/or the like. For example, if a user is located in an apartment and an advertisement is targeting people with yards, then data captured from the user located in the apartment may be excluded. In some scenarios, the second content device 108 (e.g., or the analysis device 112) may be able to use the demographic information to determine whether to cause activation of the data capture component. The data capture component of a user device 110 of the user in the apartment may not be activated if the user does not match the target audience of an advertisement associated with the advertising event.

The analysis device 112 may be configured to determine a portion of the data associated with a particular user at a location, which has several users (e.g., a family, roommates). The analysis device 112 may be configured to determine a portion of audio data associated with a specific user based on a voice signature, a frequency, loudness, speed, and/or other information. If the specific user matches a target audience (e.g., based on age, gender, race, other user profile information), the analysis device 112 may prioritize analysis of the portion of data (e.g., audio data) associated with the specific user. If the user does not match the target audience, the analysis device 112 may be configured to exclude the portion of the data associated with the specific user.

The analysis device 112 and/or the second content device 108 may send the detected events, usage information, and/or interest to the advertisement device 106. The advertisement device 106 may receive (e.g., from the second content device 108 or the analysis device 112) the usage information and/or data indicative of the determined interest in the advertisement. The advertisement device 106 may update an account associated with the second content device 108 based on the received usage information and/or data indicative of the determined interest in the advertisement. The advertisement device 106 may base future selections of advertisements, at least in part, on the updated account.

Figure 2:
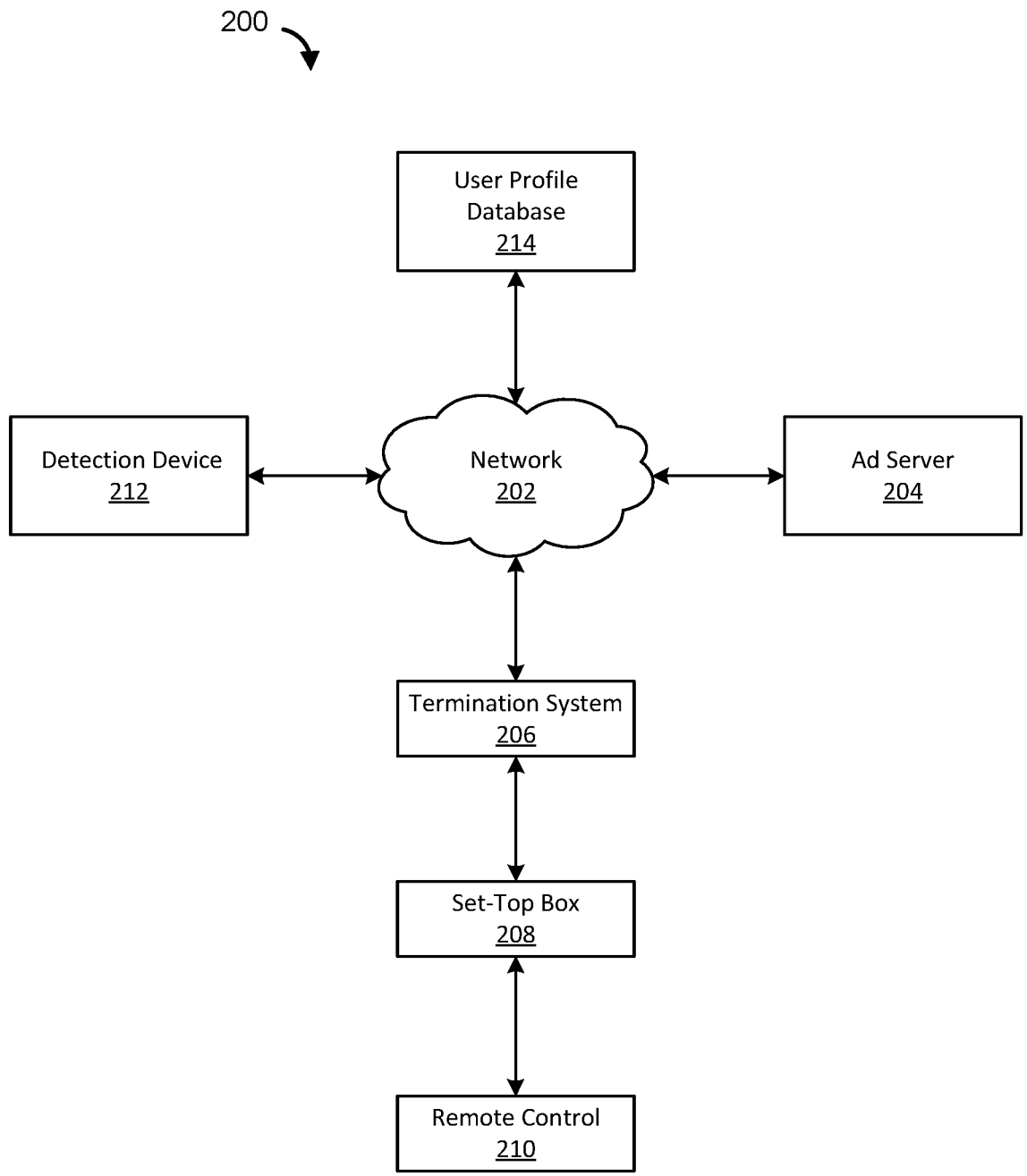
FIG. 2 is a block diagram of an example system for sending content.

FIG. 2 is a block diagram showing an example system 200 for determining user behavior. The system 200 may comprise a network 202, an advertisement server 204, a termination system 206, a set-top box 208, a remote control 210, a detection device 212, a user profile database 214, and/or the like.

The network 202 may comprise a video backend, a content access and/or delivery network, and/or the like. The network 202 may be configured to enable communication between the set-top box 208, the detection device 212, a user profile database 214, and the advertisement server 204. The set-top box 208 may be associated with an account. The remote control 210 may communicate with the set-top box 208 using radio frequency (RF) communication, Bluetooth, Wi-Fi, or any other communication method. The remote control 210 may comprise an audio input (e.g., a microphone). The set-top box 208 may be in communication with the termination system 206 via coaxial cable, fiber optical links, the like, and/or any combination of the foregoing.

The advertisement server 204 may send advertisement information (e.g., an advertisement cue, start time, manifest, the one or more keywords, fragment locations) to the set-top box 208 via the network 202 and the termination system 206. The advertisement information may comprise a manifest. The advertisement server 204 may comprise a plurality of advertisement manifests. Each of the advertisement manifests may be associated with corresponding advertising content. The advertisement manifests may comprise one or more keywords indicative of topics, products, subjects, genres, actors, media campaigns (e.g., hashtag with keyword), and/or the like relevant to the corresponding advertising content. The advertisement information may comprise Society of Cable Telecommunications Engineers (SCTE)-30 and/or SCTE-35 signaling. The advertisement information may indicate that an advertising event is upcoming. The advertisement server 204 may cause the detection device 212 to receive the advertisement manifest and/or one or more desired keywords from the advertisement manifest. The advertisement manifest may be associated with at least one of the one or more advertisements.

The termination system 206 may comprise a cable modem termination systems, a cable headend, and/or the like. The set-top box 208 may communicate with the termination system 206 using Data Over Cable Service Interface Specification (DOCSIS). The set-top box 208 may receive content, from the termination system 206, as a plurality of content channels sent in one or more transport streams to a plurality of users. The network 202 may comprise a service network associated with a service premises or a distributed content access and/or delivery system. The advertising information may be sent via the termination system 206 to the set-top box 208.

The set-top box 208 may cause, in response to the advertising information, the remote control 210 to activate the audio input. The remote control may send audio data received from the audio input to the set-top box 208. The set-top box 208 may determine the lowest level and the loudest level (e.g., the audio range) before an advertising event associated with the advertising information. The advertising event may comprise one or more advertisements.

The audio input of the remote control 210 may continue to capture audio data during the advertising event. The remote control 210 may send the audio data to the set-top box 208. The set-top box 208 may determine one or more metrics and/or usage information based on the audio data captured during the advertising event. If the loudest level of the audio range is not detected in the audio data captured during the advertising event, then a mute of the audio output associated with the advertising event may be detected. If the loudest level of the audio range is detected in the audio data captured during the advertising event, then no mute of the audio output associated with the advertising event may be detected. If a mute is detected and then the loudest level of the audio range is detected in the audio data captured during the advertising event, then an unmute may be detected. If ambient noise increases above the loudest level of the audio range, then a conversation may be detected. If a change in ambient noise is detected, then a conversation may be detected. A user may intentionally indicate feedback. A user may request information associated with an advertisement.

The set-top box 208 may send, to the detection device 212 via the termination system 206 and the network 202, the audio data, the usage information, and/or the one or more metrics. Advertisement information may also be sent. The advertisement information may comprise an identification of an advertisement associated with the detected audio data, the usage information, and/or the one or more metrics. The detection device 212 may use the detected audio data, the usage information, and/or the one or more metrics to determine an interest level in an advertisement. In some scenarios, the detection device 212 may only receive the audio data and may use the audio data to determine the usage information, the one or more metrics, and/or the interest. The set-top box 208 may send the user request for the advertisement information to the detection device 212. Other data sensor data and/or user input may also be captured and analyzed.

If a mute is detected, then disinterest in the advertisement associated with the advertising event may be determined. If an unmute is detected, then interest in the advertisement associated with the advertising event may be determined. If a conversation is detected, then any audio associated with the advertisement associated with advertising event may be filtered out. The conversation may be parsed using natural language processing (NLP) and words in the conversation may be identified. The detection device 212 may compare identified words with one or more keywords associated with an advertisement. If the comparison of identified words with one or more keywords indicates a match, then interest in the advertisement associated with the detected cues may be detected. If the comparison of identified words with desired keywords indicates no match, then disinterest in the advertisement associated with the advertising event may be determined.

The detection device 212 may send the determined usage information and/or interest (e.g., interest level) to the user profile database 214 via the network 202. The user profile database 214 may update information associated with the account associated with the set-top box 208 based on the determined usage information and/or interest. Future advertisements served to the set-top box 208 by the advertisement server 204 may be determined based on the information associated with the account associated with the set-top box 208 in the user profile database 214. The detection device 212 may cause the advertisement server 204 to deliver the specific advertisement requested to the set-top box 208. The set-top box 208 may cause the audio input on the remote control 210 to discontinue recording audio data when the advertising event is over and/or when the set-top box 208 is tuned to a different channel.

In some implementations, audio after the advertising event may be used in addition to or instead of audio before the advertising event. A noise level associated with (e.g., or based on) audio data captured after the advertising event may be compared to a noise level (e.g., or based on) associated with audio data captured during the advertising event.

Figure 3A:
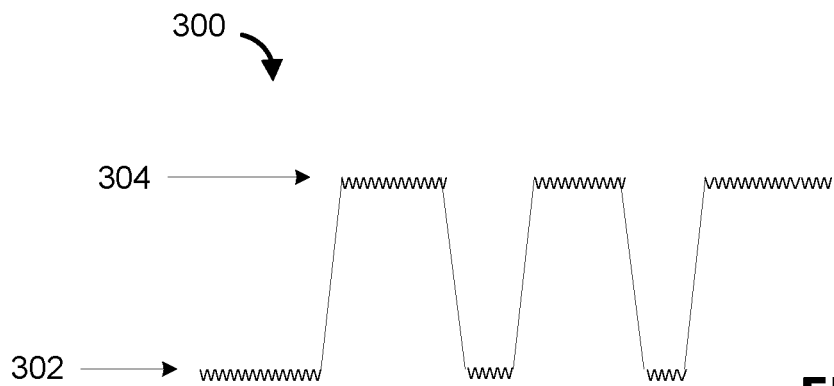
FIG. 3A is an example audio signal.

FIG. 3A shows an example audio signal 300. The audio signal 300 may represent audio data recorded just prior to an advertising event. The audio data may be recorded based on (e.g., in response to) receiving an activation trigger from a device, such as the second content device 108. The audio data may be recorded by the user device 110. A lower amplitude section 302 may correspond to a time (e.g., a break in dialogue or other noise) when no audio (e.g., or less audio) is being output from a media player (e.g., display, speakers) associated with the second content device 108 of FIG. 1 or the set-top box 208 of FIG. 2. The lower amplitude section 302 may indicate ambient noise in a room in the absence of audio from the media player. A higher amplitude section 304 may correspond to a time when audio is being output from the media player. The higher amplitude and/or the lower amplitude may be used to determine usage information as described herein. Though the higher amplitude is shown as the same across multiple waves, it should be understood that the higher amplitude may vary over time (e.g., based on variations in the content). The lower amplitude may also vary over time. An average higher amplitude may be determined. An average lower amplitude may be determined. The average higher amplitude and/or the average lower amplitude may be used to determine usage information as described herein.

Figure 3B:
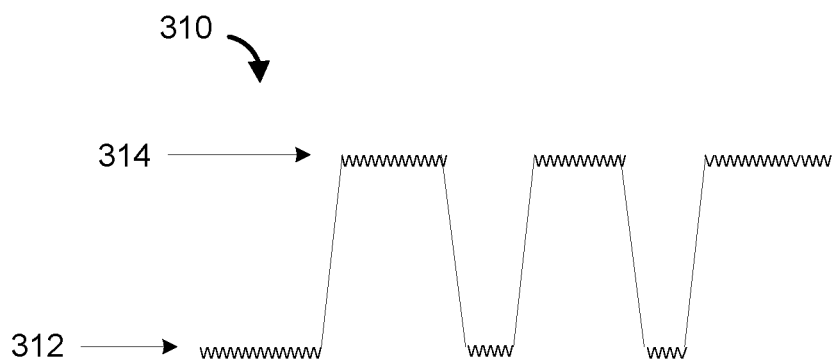
FIG. 3B is an example audio signal.

FIG. 3B shows an example audio signal 310. The audio signal 310 may represent audio recorded during an advertising event when no conversation takes place. A lower amplitude section 312 may correspond to a time when no audio is being output from the media player. If audio from the media player were muted, then all of the audio signal 310 may be in the lower amplitude section 312. A higher amplitude section 314 may correspond to a time when audio is being output from the media player. The higher amplitude (e.g., or an average thereof) and/or the lower amplitude (e.g., or an average thereof) may be used to determine usage information as described herein.

Figure 3C:
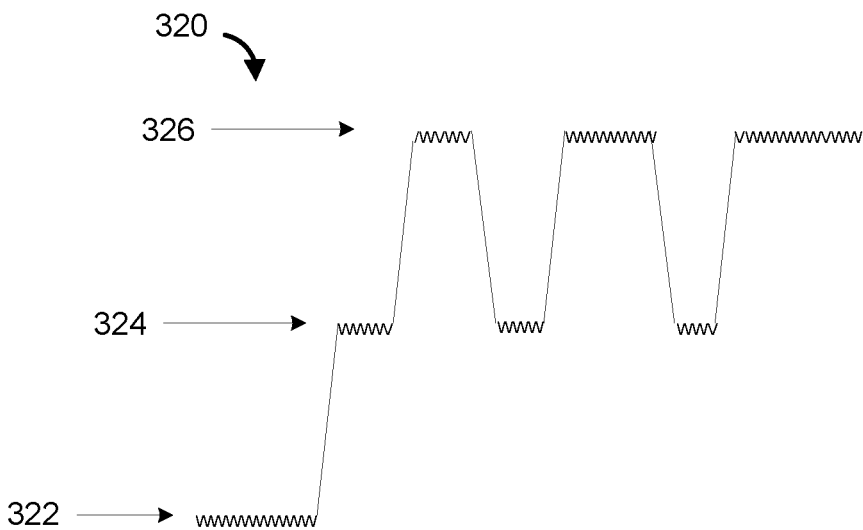
FIG. 3C is an example audio signal.

FIG. 3C shows an example audio signal 320. The audio signal 320 may represent audio recorded during an advertising event when conversation takes place. A lower amplitude section 322 may correspond to a time when no audio is being output from the media player (e.g., and when no one is talking in the conversation). A midlevel amplitude section 324 may correspond to a time when audio is being output from the media player. If no one is talking in the conversation and the media player is outputting audio, then audio at the midlevel amplitude section 324 may be expected. A higher amplitude section 326 may correspond to a time when at least one person in a conversation is talking (e.g., the content may also be playing in the background). Audio associated with content played during the advertising event (such as the audio represented by the audio signal 310 in FIG. 3B) may be filtered out of the audio signal 320 to leave audio associated with the conversation. Although not shown here, a conversation may take place when audio from the media player is muted. A conversation that takes place when audio from the media player is muted may be recorded as an audio signal for processing as well. The conversation may be processed to find keywords associated with advertisements in the advertising event. Additional audio factors, such as pitch, tone, etc., may be processed to determine (e.g., estimate, etc.) a demographic of a viewer of the media player. The additional audio factors may also be used to determine usage information, an interest in an advertisement in the advertising event, a user present during the advertising event, demographics (e.g., age, gender) associated with the user, and/or the like.

Figure 4:
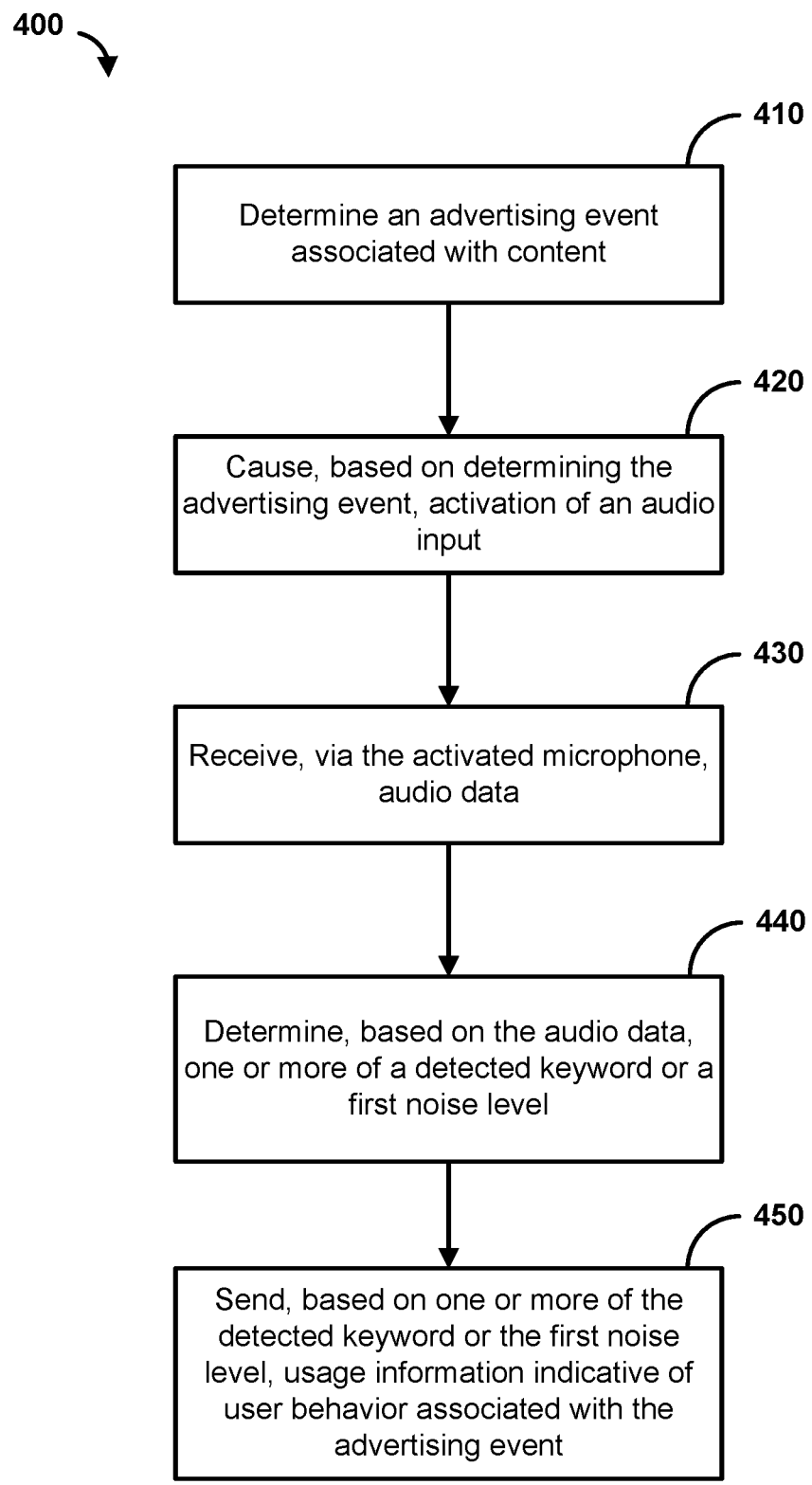
FIG. 4 is a flow diagram of an example method.

FIG. 4 is a flow diagram showing an example method 400 for determining usage information. At step 410, an advertising event associated with content may be determined. Determining the advertising event associated with the content may comprise determining, by a content device configured to receive content, the advertising event. The content device may be located at a user premises associated with a user of a content service. The set-top box 208 in FIG. 2 may determine an advertising event associated with content. The detection device 212 in FIG. 2 may determine an advertising event associated with content. The content may be received based on the content service. The advertising event may be determined based on one or more of an electronic program guide, a manifest, or an advertising cue.

At step 420, activation of an audio input may be caused. The audio input may comprise an audio input device, audio input component, audio receiver, microphone, and/or the like. The activation may be caused based on determining the advertising event. The set-top box 208 in FIG. 2 may cause activation of an audio input based on determining the advertising event. The detection device 212 in FIG. 2 may cause activation of the audio input based on determining the advertising event. The audio input may be comprised in a control device configured to navigate the content. The control device may comprise a remote control, a mobile device, a smart device (e.g., a smart speaker, a smart apparel, a smart watch, a virtual assistant). Causing, based on determining the advertising event, activation of the audio input may comprise causing activation of the audio input at a first time before the advertising event. Causing activation of the audio input may comprise causing, by a content device located at a user premises, activation of the audio input. Causing activation of the audio input may comprise sending, to a control device comprising the audio input, a wireless signal, an infrared signal, a message, and/or the like. In some scenarios, the audio input may already be activated. Causing activation of the audio input may comprise confirming that the audio input is active. Causing activation of the audio input may comprise causing the audio input to change from a first mode to a second mode. The first mode may comprise a passive listening mode (e.g., only send audio data when a keyword is detected). The second mode may comprise an active listening mode (e.g., record and/or send all audio data).

At step 430, audio data may be received via the activated audio input. The set-top box 208 in FIG. 2 may receive audio data via the activated audio input. The detection device 212 in FIG. 2 may receive audio data via the activated audio input. Receiving, via the activated audio input, audio data may comprise receiving, via one or more of a wireless link or an infrared link, the audio data.

At step 440, one or more of a detected keyword or a first noise level may be determined based on the audio data. The set-top box 208 in FIG. 2 may determine one or more of a detected keyword or a first noise level based on the audio data. The detection device 212 in FIG. 2 may determine one or more of a detected keyword or a first noise level based on the audio data. Determining one or more of a detected keyword or a first noise level may comprise determining the first noise level based on the first time and a second noise level based on a second time during the advertising event. Determining one or more of a detected keyword or a first noise level may comprise sending the audio data to a computing device located external to the user premises. The one or more of the detected keyword or the first noise level may be received from the computing device.

At step 450, usage information may be sent. The usage information may be indicative of user behavior associated with the advertising event. The set-top box 208 in FIG. 2 may send the usage information may be based on one or more of the detected keyword or the first noise level. The detection device 212 in FIG. 2 may send usage information indicative of user behavior associated with the advertising event based on one or more of the detected keyword or the first noise level. The usage information may comprise an advertising metric. The usage information may be determined based on one or more of the detected keyword or the first noise level. The set-top box 208 in FIG. 2 may determine the usage information based on one or more of the detected keyword or the first noise level. The detection device 212 in FIG. 2 may determine the usage information based on one or more of the detected keyword or the first noise level. The usage information may comprise one or more of an indication that a user was present during the advertising event, an indication that the user was absent during the advertising event, an indication that the user talked during the advertising event, an indication that the user was silent during the advertising event, an indication that the user adjusted a volume of an advertisement associated with advertising event, an indication that the user discussed the advertisement associated with the advertising event, a combination thereof, and/or the like. Determining the usage information may comprise determining whether the detected keyword matches a keyword associated with the advertising event. Determining whether the detected keyword matches a keyword associated with the advertising event may comprise determining the keyword associated with the advertising event based on metadata in one or more of a manifest, a field of the content, or an electronic program guide. Determining the usage information may comprise comparing the first noise level to a threshold noise level indicative of user interest in viewing content. Determining the usage information may comprise comparing the first noise level to a second noise level. The first noise level may be associated with a first time before or after the advertising event. The second noise level may be associated with a second time during the advertising event. The audio input may be caused to deactivate at a time associated with an ending of the advertising event. The set-top box 208 in FIG. 2 may cause the audio input to deactivate at a time associated with an ending of the advertising event. The detection device 212 in FIG. 2 may cause the audio input to deactivate at a time associated with an ending of the advertising event.

A user may be watching television via a content device (e.g., a set-top box, a digital streaming device, a digital content device) located at a premises of the user. The content device may determine an advertising event. The content device may receive an indication of an incoming advertising event from an advertisement server. The user may control the content device using a remote control or a smart phone running an application associated with a content service. The content device may cause activation of an audio input (e.g., microphone) on a remote control or the smart phone to activate in response to the indication of the incoming advertising event. The audio input may capture ambient noise as the television is playing just before the advertising event. The advertisement server may send one or more advertisements associated with the advertising event to the content device. The content device may cause the one or more advertisements to be output on the television during the advertising event. The audio input may continue to capture audio during the advertising event. Audio data at a first time during the advertising event may be at a lower level observed prior to the advertising event. A determination may be made that the television audio is muted. Audio data at a subsequent time during the advertising event may be consistent with a range observed prior to the advertising event. A determination may be made that the television audio was unmuted during a currently output advertisement. The content device may send the determination that the television was unmuted during the current advertisement to the detection device, along with information about the current advertisement. The detection device may determine that a user associated with the content device is interested in the advertisement. The detection device may cause the user profile database to be updated with the determination that the user is interested in the advertisement.

Figure 5:
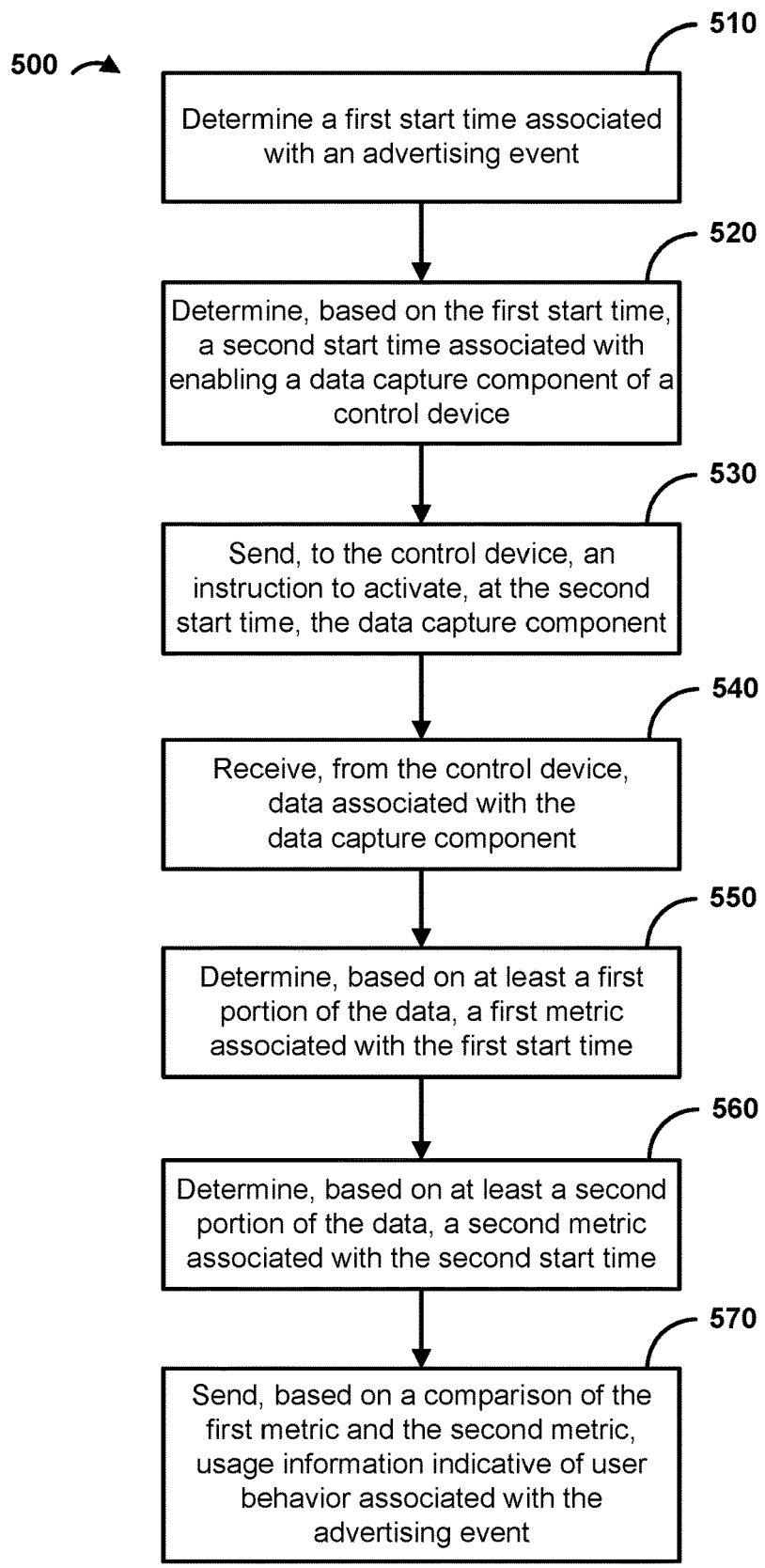
FIG. 5 is a flow diagram of an example method.

FIG. 5 is a flow diagram showing an example method for determining usage information. At step 510, a first start time associated with an advertising event may be determined. The set-top box 208 in FIG. 2 may determine a first start time associated with an advertising event. The detection device 212 in FIG. 2 may determine a first start time associated with an advertising event. The determining the first start time associated with the advertising event may comprise determining, by a content device configured to receive content, that the first start time is associated with the advertising event. The content device may be located at a user premises associated with a user of a content service. The content may be received based on the content service. The first start time may be determined based on one or more of an electronic program guide, a manifest, or an advertising cue.

At step 520, a second start time associated with enabling a data capture component (e.g., audio input, microphone) of a control device (e.g., or a remote device, a remote control, a mobile device, a sensor, a tablet device, a smart phone, a smart watch, smart glasses, smart apparel) may be determined based on the first start time. The set-top box 208 in FIG. 2 may determine a second start time associated with enabling a data capture component of the remote control 210 of FIG. 2 based on the first start time. The detection device 212 in FIG. 2 may determine a second start time associated with enabling a data capture component of the control device based on the first start time.

At step 530, an instruction to activate (e.g., or cause activation) a data capture component (e.g., a microphone) of the control device may be sent to the control device at the second start time. The set-top box 208 in FIG. 2 may send the remote control 210 of FIG. 2 an instruction to activate the data capture component at the second start time. The detection device 212 in FIG. 2 may send an instruction to activate the data capture component at the second start time. The control device may be configured to navigate content. The control device may comprise a remote control or a mobile device. The control device may comprise a display (e.g., a screen, a touchscreen) or may not have a display. The control device may comprise a plurality of navigation buttons (e.g. with or without a display). The data capture component may comprise one or more of an audio input (e.g., microphone, noise level sensor, noise detector), a camera, a video camera, a light sensor, an accelerometer, a gyroscope, a global positioning system sensor, a key logger, and/or any other data capturing mechanism. Sending the instruction to activate, at the second start time, the data capture component of the control device may comprise sending, to the control device, an infrared signal (e.g., or other wireless signal) comprising the instruction.

In some scenarios, the data capture component may already be activated. The instruction to activate the data capture component may comprise an instruction to confirm that the audio input is active. The instruction to activate the data capture component may comprise an instruction to change from a first mode to a second mode. The first mode may comprise a passive listening mode (e.g., only send audio data when a keyword is detected). The second mode may comprise an active listening mode (e.g., record and/or send all audio data).

At step 540, data associated with the data capture component (e.g., the microphone) may be received from the control device. The data may be received based on the instruction. The set-top box 208 in FIG. 2 may receive data associated with the audio input from the remote control 210 of FIG. 2 and based on the instruction. Detection device 212 in FIG. 2 may receive data associated with the data capture component (e.g., the microphone) from the control device and based on the instruction. Receiving data associated with the data capture component (e.g., the microphone) may comprise receiving, via one or more of a wireless link or an infrared link, the data.

At step 550, a first metric associated with the first start time may be determined based on at least a first portion of the data. The set-top box 208 in FIG. 2 may determine a first metric associated with the first start time based on at least a first portion of the data. The detection device 212 in FIG. 2 may determine a first metric associated with the first start time based on at least a first portion of the data. The first portion of the data may comprise data (e.g., audio data or other captured data) associated with the advertising event.

At step 560, a second metric associated with the second start time may be determined based on at least a second portion of the data. The set-top box 208 in FIG. 2 may determine a second metric associated with the second start time based on at least a second portion of the data. The detection device 212 in FIG. 2 may determine a second metric associated with the second start time based on at least a second portion of the data. The second portion of the data may comprise data (e.g., audio data or other captured data) associated with content played before the advertising event.

At step 570, usage information may be sent. The usage information may be indicative of user behavior associated with the advertising event. The usage information may be based on a comparison of the first metric and the second metric. The usage information may be sent based on the comparison. The set-top box 208 in FIG. 2 may send the usage information based on a comparison of the first metric and the second metric. The detection device 212 in FIG. 2 may send the usage information based on a comparison of the first metric and the second metric. The usage information may comprise an advertising metric. The usage information may be determined based on the comparison. The set-top box 208 in FIG. 2 may determine the usage information based on the comparison. The detection device 212 in FIG. 2 may determine the usage information based on the comparison. The usage information may comprise one or more of an indication that a user was present during the advertising event, an indication that the user was absent during the advertising event, an indication that the user talked during the advertising event, an indication that the user was silent during the advertising event, an indication that the user adjusted a volume of an advertisement associated with advertising event, an indication that the user discussed the advertisement associated with the advertising event, a combination thereof, and/or the like. Determining the usage information may comprise determining, based on the first portion of the data, a keyword. It can be determined whether the keyword matches a keyword associated with the advertising event. Determining whether the keyword matches a keyword associated with the advertising event may comprise determining the keyword associated with the advertising event based on metadata in one or more of a manifest, a field of content associated with the advertising event, or an electronic program guide. The first metric may comprise a first noise level and the second metric may comprise a second noise level. Determining the usage information may comprise comparing the first noise level to a threshold noise level indicative of user interest in viewing content. Determining the usage information may comprise comparing the first noise level to the second noise level. The data capture component (e.g., the microphone) may be caused to deactivate at a time associated with an ending of the advertising event. The set-top box 208 in FIG. 2 may cause the data capture component (e.g., the microphone) to deactivate at a time associated with an ending of the advertising event. The detection device 212 in FIG. 2 may cause the data capture component (e.g., the microphone) to deactivate at a time associated with an ending of the advertising event.

A user may be watching television via a content device (e.g., a set-top box). The content device may be located at a user premises. The content device may be associated (e.g., paired) with a remote control. The content device may receive an indication of an upcoming advertising event from an advertisement server. The content device may determine an upcoming advertising event based on an advertisement cue (e.g., an SCTE field) sent with the content. The content device may cause a data capture component (e.g., the microphone) on the remote control to activate in response to the indication of the upcoming advertising event. The data capture component (e.g., the microphone) may capture ambient noise as the television is playing just before the advertising event. The advertisement server may send one or more advertisements associated with the advertising event to the content box. The advertisements may already be embedded in the content. The content device may cause the one or more advertisements to be output on the television during the advertising event. The data capture component (e.g., the microphone) may continue to capture data (e.g., audio data) during the advertising event. The content device may detect a channel change. The content device may cause the data capture component (e.g., the microphone) to deactivate in response to the channel change.

Figure 6:
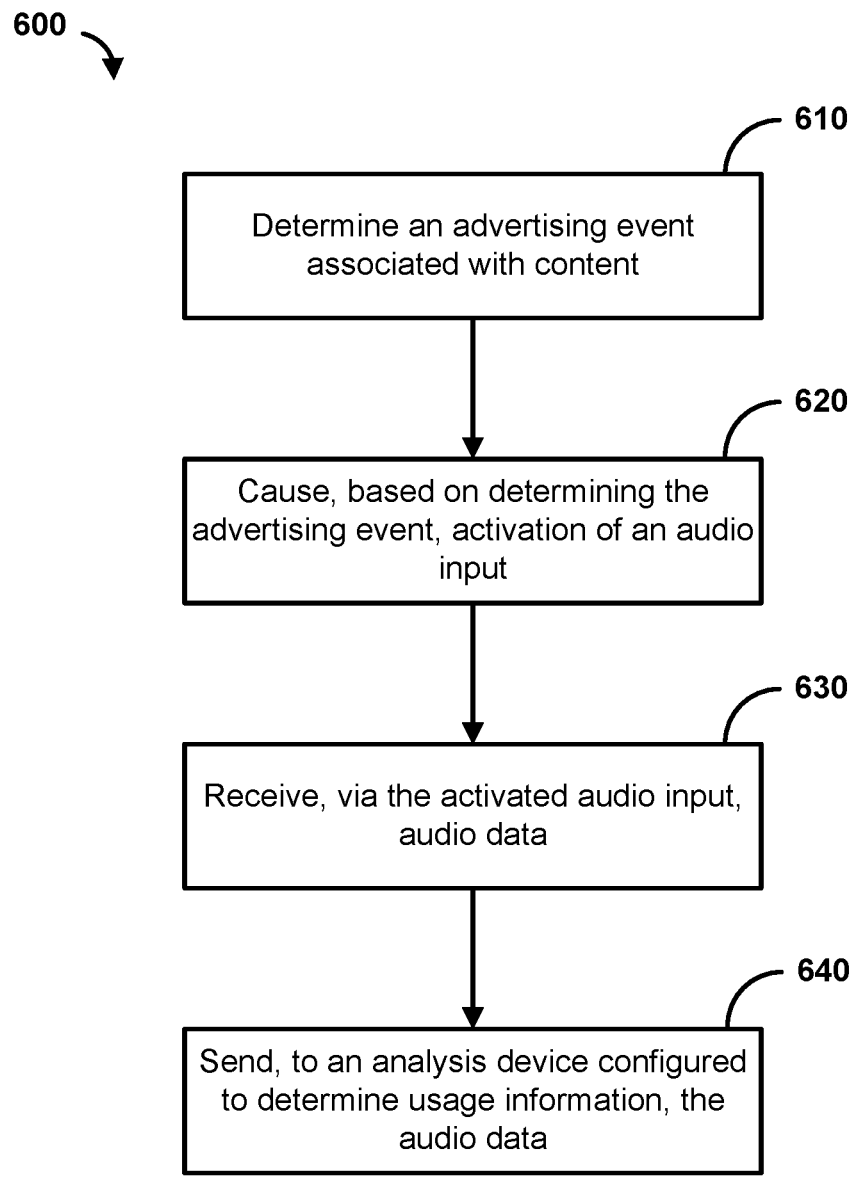
FIG. 6 is a flow diagram of an example method.

FIG. 6 is a flow diagram showing an example method of determining usage information. At step 610, an advertising event associated with content may be determined. The set-top box 208 in FIG. 2 may determine an advertising event associated with content. The determining the advertising event associated with the content may comprise determining, by a content device configured to receive content, the advertising event. The content device may be located at a user premises associated with a user of a content service. The content may be received based on the content service. The advertising event may be determined based on one or more of an electronic program guide, a manifest, or an advertising cue.

At step 620, activation of an audio input (e.g., or other data capture component) may be caused. Activation of the audio input may be caused based on determining the advertising event. The audio input may comprise an audio input device, audio input component, audio receiver, microphone, and/or the like. The set-top box 208 in FIG. 2 may cause activation of an audio input (e.g., a microphone) based on determining the advertising event. The audio input may be comprised in a control device configured to navigate the content. The control device may comprise a remote control or a mobile device. Causing, based on determining the advertising event, activation of the audio input may comprise causing the audio input to activate at a first time before the advertising event. Causing activation of the audio input may comprise sending, to a control device comprising the audio input, an infrared signal. In some scenarios, the audio input may already be activated. Causing activation of the audio input may comprise confirming that the audio input is active. Causing activation of the audio input may comprise causing the audio input to change from a first mode to a second mode. The first mode may comprise a passive listening mode (e.g., only send audio data when a keyword is detected). The second mode may comprise an active listening mode (e.g., record and/or send all audio data).

At step 630, audio data (e.g., or other data) associated with the audio input may be received via the activated audio input. The audio data may be associated with (e.g., identified as received from and/or generated by) the audio input. The set-top box 208 in FIG. 2 may receive audio data via the activated audio input. Receiving, via the activated audio input, audio data may comprise receiving, via one or more of a wireless link or an infrared link, the audio data. The audio data may be received from the control device. The audio data may be encoded, compressed, encrypted, and/or the like by the control device.

At step 640, the audio data (e.g., or the other data) may be sent to an analysis device. The set-top box 208 in FIG. 2 may send the audio data to the detection device 212 in FIG. 2. The analysis device may be configured to determine usage information indicative of user behavior associated with the advertising event based on the audio data. The content device may be located at a user premises. The analysis device may be located external to the user premises. The usage information may comprise an advertising metric. The analysis device may be configured to determine, based on the audio data, one or more of a keyword or a first noise level and determine based on one or more of the keyword or the first noise level, the usage information. The usage information may comprise one or more of an indication that a user was present during the advertising event, an indication that the user was absent during the advertising event, an indication that the user talked during the advertising event, an indication that the user was silent during the advertising event, an indication that the user adjusted a volume of an advertisement associated with advertising event, an indication that the user discussed the advertisement associated with the advertising event, a combination thereof, and/or the like. The analysis device being configured to determine the usage information may comprise the analysis device being configured to determine whether the keyword matches a keyword associated with the advertising event. The analysis device being configured to determine whether the keyword matches a keyword associated with the advertising event may comprise the analysis device being configured to determine the keyword associated with the advertising event based on metadata in one or more of a manifest, a field of the content, or an electronic program guide. The analysis device being configured to determine the usage information may comprise the analysis device being configured to compare the first noise level to a threshold noise level indicative of user interest in viewing content. Determining the usage information may comprise comparing the first noise level to a second noise level. The first noise level may be associated with a first time before or after the advertising event and the second noise level may be associated with a second time during the advertising event. The audio input may be caused to deactivate at a time associated with an ending of the advertising event. The set-top box 208 in FIG. 2 may cause the audio input to deactivate at a time associated with an ending of the advertising event.

Figure 7:
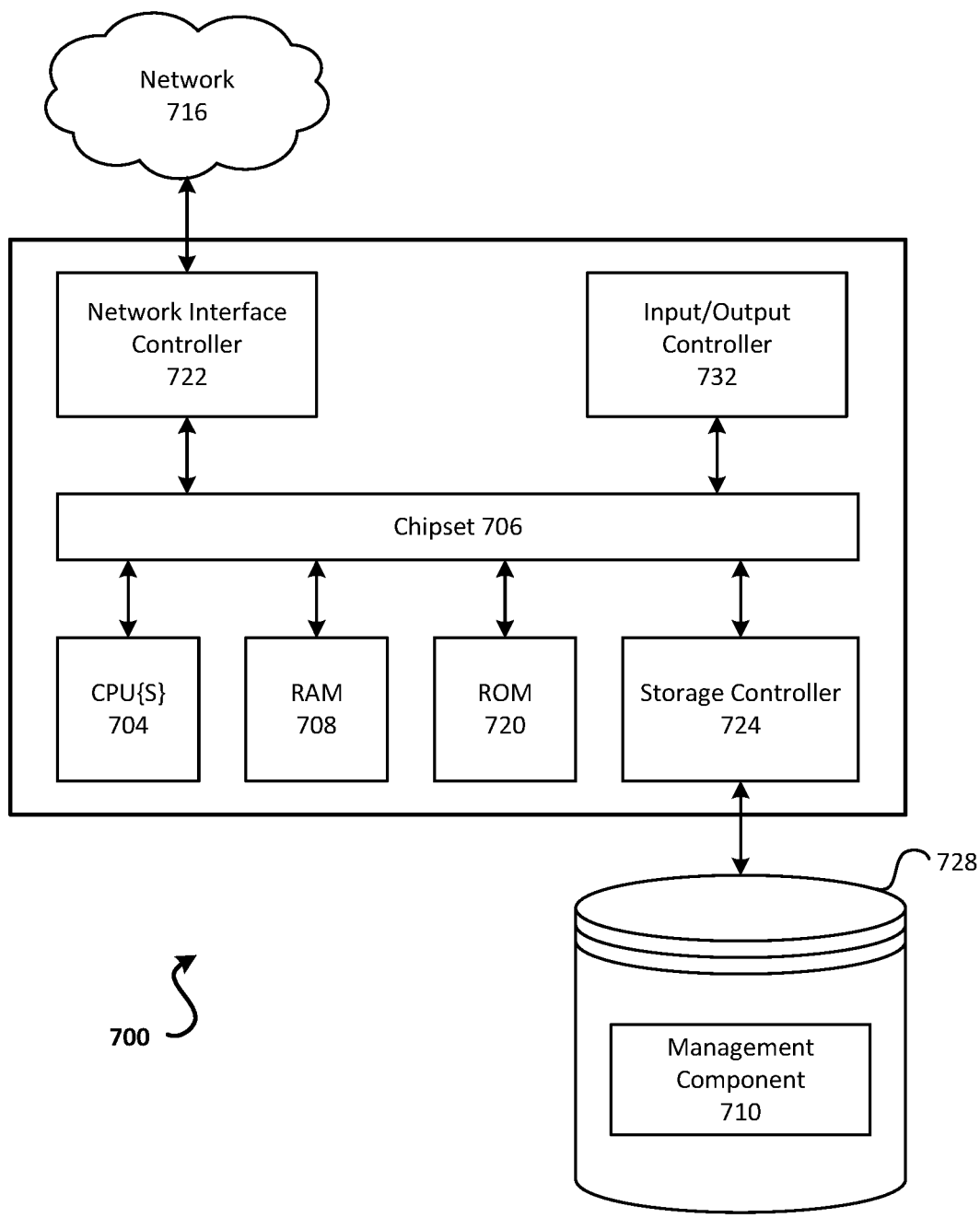
FIG. 7 is a block diagram of an example operating environment.

A user may be watching television via a content device (e.g., a set top box). The content device may be located at a premises of the user. The content device may be associated with a remote control. The content device may determine an indication of an upcoming advertising event. The content device may receive an indication of an incoming advertising event from an advertisement server. The content device may cause an audio input (e.g., microphone) on the remote control to activate in response to determining the indication of the upcoming advertising event. The audio input may receive an instruction capture ambient noise as the television is playing at a first time before the start of the advertising event. The advertisement server may send one or more advertisements associated with the advertising event to the content device. The advertisement server may send one or more keywords associated with the one or more advertisements to a detection device (e.g., or the content device). The content device may cause the one or more advertisements to be output on the television during the advertising event. The audio input may continue to capture audio during the advertising event. Audio data captured during the advertising event may indicate a change in ambient noise from the ambient noise captured before the advertising event. The content device may send the audio data comprise audio captured before and during the advertising event to the detection device. The content device may send advertisement information to the detection device. The advertisement information may comprise advertisement audio, an advertisement identifier, an advertisement campaign, the one or more keywords from the detection device, and/or the like. The detection device may filter out the advertisement audio from the audio data. The detection device may determine conversation audio (e.g., based on the filtered or unfiltered audio). Words within the conversation audio may be identified by using natural language processing. The identified words may be compared against the one or more keywords associated with the one or more advertisements. The detection device may find a match between the identified words and the one or more received keywords. The detection device may determine usage information, such as an interest in an advertisement associated with the one or more matched keywords. The identified words may also be matched against one or commands. The commands may comprise a command to interact the advertisement, a command to search more about a subject and/or topic indicated in the advertisement, a command to send a message (e.g., a social media message) based on the advertisement, and/or the like. The usage information may indicate that the user discussed the advertisement, interacted with the advertisement, performed an action based on the advertisement, and/or the like. The detection device may update a user profile database based on the determined interest in the advertisement. FIG. 7 shows an example computer architecture for a computer 700 configured to execute software for performing operations as described above in connection with FIGS. 1-6. It will be appreciated that the described processes may be performed by any suitable system components including by discrete computing systems that communicate over a communications link. The computer architecture shown in FIG. 7 shows a conventional server a computer, a workstation, a desktop computer, a laptop, a tablet, a network appliance, a PDA, an e-reader, a digital cellular phone, or other computing node, and may be utilized to execute any aspects of the software components presented herein.

The computer 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. CPUs 704 may be standard programmable processors that perform arithmetic and logical operations necessary for the operation of computer 700.

The CPUs 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The chipset 706 may provide an interface between CPUs 704 and the remainder of the components and devices on the baseboard. The chipset 706 may provide an interface to a random access memory (RAM) 708 used as the main memory in computer 700. The chipset 706 may provide an interface to a computer-readable storage medium, such as a read-only memory (ROM) 720 or non-volatile RAM (NVRAM) (not shown), for storing basic routines that may help to start up the computer 700 and to transfer information between the various components and devices. The ROM 720 or NVRAM may also store other software components necessary for the operation of computer 700 in accordance with the embodiments described herein.

The computer 700 may operate in a networked environment using logical connections to remote computing nodes and computer systems through LAN 716. The chipset 706 may include functionality for providing network connectivity through a network interface controller (NIC) 722, such as a gigabit Ethernet adapter. NIC 722 may be configured to connect the computer 700 to other computing nodes over the LAN 716. It should be appreciated that multiple NICs 722 may be present in the computer 700, connecting the computer to other types of networks and remote computer systems.

The computer 700 may be connected to a mass storage device 728 that provides non-volatile storage for the computer. The mass storage device 728 may store system programs, application programs, other program modules, and data, which have been described in greater detail herein. The mass storage device 728 may be connected to the computer 700 through a storage controller 724 connected to the chipset 706. The mass storage device 728 may comprise of one or more physical storage units. The storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

The computer 700 may store information to the mass storage device 728 by issuing instructions through the storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may read information from the mass storage device 728 by detecting the physical states or characteristics of one or more particular locations within the physical storage units.

The computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 700.

The computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

The mass storage device 728 may store an operating system utilized to control the operation of the computer 700. According to one embodiment, the operating system comprises a version of the LINUX operating system. According to another embodiment, the operating system may comprise a version of the WINDOWS SERVER operating system from the MICROSOFT Corporation. The operating system may comprise a version of the UNIX operating system. It should be appreciated that other operating systems may also be utilized. The mass storage device 728 may store other system or application programs and data utilized by the computer 700, such as the management component 710 and/or the other software components described above. The management component 710 may be configured to implement the disclosure described herein.

The mass storage device 728 or other computer-readable storage media may also be encoded with computer-executable instructions, which, when loaded into the computer 700, transforms the computer from a general-purpose computing system into a special-purpose computer capable of implementing the embodiments described herein. These computer-executable instructions transform the computer 700 by specifying how CPUs 704 transition between states, as described above. The computer 700 may have access to computer-readable storage media storing computer-executable instructions, which, when executed by the computer 700, may perform operating procedures described above in connection with FIGS. 2-6.

The computer 700 may also include an input/output controller 732 for receiving and processing input from a number of input devices, such as a keyboard, a mouse, a touchpad, a touch screen, an electronic stylus, or other type of input device. Similarly, the input/output controller 732 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

It will be appreciated that while illustrative embodiments have been disclosed, the scope of potential embodiments is not limited to those explicitly described. While the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition or in the alternative, certain method or process blocks may be omitted in some implementations. The methods and processes described herein are also not limited to any particular sequence, and the blocks or states relating thereto can be performed in other sequences that are appropriate. The described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. The elements may be added to, removed from or rearranged compared to the disclosed example embodiments.

It will also be appreciated that various items are shown as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the computing systems via inter-computer communication. In some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the features described herein may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the disclosure described herein may be embodied in a variety of other forms; furthermore, various omissions, substitutions, and changes in the form of the disclosure described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
    causing, based on determining an advertising event associated with content, activation of an audio reception device;
    receiving, from the activated audio reception device, audio data; and
    sending, to an analysis device, the audio data, wherein the analysis device is configured to determine, based on a comparison of a first metric associated with a first portion of the audio data to a second metric associated with a second portion of the audio data from before or after the advertisement event, usage information indicative of user behavior associated with the advertising event.

2. The method of claim 1, wherein the first portion of the audio data comprises audio data associated with content played before or after the advertising event, and wherein the second portion of the audio data comprises audio data associated with the advertising event.

3. The method of claim 1, wherein the usage information comprises at least one of:
an advertising metric,
an indication of an event,
an indication of an interest level in an advertisement associated with the advertising event,
an indication of an interest or disinterest in an advertisement associated with the advertising event,
an indication of muting or unmuting of an advertisement associated with the advertising event,
an indication of a conversation,
an indication of a lack of conversation, or
an indication of a request for information about an advertisement associated with the advertising event.

4. The method of claim 1, wherein the first metric comprises a first noise level and the second metric comprises a second noise level.

5. The method of claim 1, wherein causing activation of the audio reception device comprises causing, by a content device configured to receive content, activation of the audio reception device.

6. The method of claim 1, wherein the audio reception device comprises or is comprised in one or more of a computing device, a user device, a control device configured to navigate the content, a remote control, a mobile device, a virtual assistant device, or a voice controlled device.

7. The method of claim 1, further comprising causing, based on the usage information, output of an additional advertisement.

8. A device comprising:
one or more processors; and
memory storing instructions that, when executed by the one or more processors, cause the device to:
cause, based on determining an advertising event associated with content, activation of an audio reception device;
receive, from the activated audio reception device, audio data; and
send, to an analysis device, the audio data, wherein the analysis device is configured to determine, based on a comparison of a first metric associated with a first portion of the audio data to a second metric associated with a second portion of the audio data from before or after the advertisement event, usage information indicative of user behavior associated with the advertising event.

9. The device of claim 8, wherein the first portion of the audio data comprises audio data associated with content played before or after the advertising event, and wherein the second portion of the audio data comprises audio data associated with the advertising event.

10. The device of claim 8, wherein the usage information comprises at least one of:
an advertising metric,
an indication of an event,
an indication of an interest level in an advertisement associated with the advertising event,
an indication of an interest or disinterest in an advertisement associated with the advertising event,
an indication of muting or unmuting of an advertisement associated with the advertising event,
an indication of a conversation,
an indication of a lack of conversation, or
an indication of a request for information about an advertisement associated with the advertising event.

11. The device of claim 8, wherein the first metric comprises a first noise level and the second metric comprises a second noise level.

12. The device of claim 8, wherein the instructions that, when executed by the one or more processors, cause the device to cause activation of the audio reception device comprises instructions that, when executed by the one or more processors, cause the device to cause, by a content device configured to receive content, activation of the audio reception device.

13. The device of claim 8, wherein the audio reception device comprises or is comprised in one or more of a computing device, a user device, a control device configured to navigate the content, a remote control, a mobile device, a virtual assistant device, or a voice controlled device.

14. The device of claim 8, wherein the instructions, when executed by the one or more processors, further cause the device to cause, based on the usage information, output of an additional advertisement.

15. A system comprising:
a computing device configured to:
cause, based on determining an advertising event associated with content, activation of an audio reception device;
receive, from the activated audio reception device, audio data; and
send the audio data; and
an analysis device configured to:
receive the audio data; and
determine, based on a comparison of a first metric associated with a first portion of the audio data to a second metric associated with a second portion of the audio data from before or after the advertisement event, usage information indicative of user behavior associated with the advertising event.

16. The system of claim 15, wherein the first portion of the audio data comprises audio data associated with content played before or after the advertising event, and wherein the second portion of the audio data comprises audio data associated with the advertising event.

17. The system of claim 15, wherein the usage information comprises at least one of:
an advertising metric,
an indication of an event,
an indication of an interest level in an advertisement associated with the advertising event,
an indication of an interest or disinterest in an advertisement associated with the advertising event,
an indication of muting or unmuting of an advertisement associated with the advertising event,
an indication of a conversation,
an indication of a lack of conversation, or
an indication of a request for information about an advertisement associated with the advertising event.

18. The system of claim 15, wherein the first metric comprises a first noise level and the second metric comprises a second noise level.

19. The system of claim 15, wherein the computing device comprises a content device configured to receive content.

20. The system of claim 15, wherein the audio reception device comprises or is comprised in one or more of a computing device, a user device, a control device configured to navigate the content, a remote control, a mobile device, a virtual assistant device, or a voice controlled device.

21. A non-transitory computer-readable medium storing computer-executable instructions that, when executed, cause:

causing, based on determining an advertising event associated with content, activation of an audio reception device;

receiving, from the activated audio reception device, audio data; and sending, to an analysis device, the audio data, wherein the analysis device is configured to determine, based on a comparison of a first metric associated with a first portion of the audio data to a second metric associated with a second portion of the audio data from before or after the advertisement event, usage information indicative of user behavior associated with the advertising event.

22. The non-transitory computer-readable medium of claim 21, wherein the first portion of the audio data comprises audio data associated with content played before or after the advertising event, and wherein the second portion of the audio data comprises audio data associated with the advertising event.

23. The non-transitory computer-readable medium of claim 21, wherein the usage information comprises at least one of:

an advertising metric, an indication of an event, an indication of an interest level in an advertisement associated with the advertising event, an indication of an interest or disinterest in an advertisement associated with the advertising event, an indication of muting or unmuting of an advertisement associated with the advertising event, an indication of a conversation, an indication of a lack of conversation, or an indication of a request for information about an advertisement associated with the advertising event.

24. The non-transitory computer-readable medium of claim 21, wherein the first metric comprises a first noise level and the second metric comprises a second noise level.

* * * * *